(12) United States Patent
Miyamoto et al.

(10) Patent No.: US 11,274,206 B2
(45) Date of Patent: Mar. 15, 2022

(54) POLYAMIDEIMIDE RESIN AND OPTICAL MEMBER INCLUDING POLYAMIDEIMIDE RESIN

(71) Applicant: SUMITOMO CHEMICAL COMPANY, LIMITED, Tokyo (JP)

(72) Inventors: Koji Miyamoto, Osaka (JP); Nozomi Masui, Tsukuba (JP); Hiroko Sugiyama, Tsukuba (JP); Katsunori Mochizuki, Tsukuba (JP); Junichi Ikeuchi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/478,713

(22) PCT Filed: Jan. 15, 2018

(86) PCT No.: PCT/JP2018/000804
§ 371 (c)(1),
(2) Date: Jul. 17, 2019

(87) PCT Pub. No.: WO2018/135431
PCT Pub. Date: Jul. 26, 2018

(65) Prior Publication Data
US 2019/0390057 A1 Dec. 26, 2019

(30) Foreign Application Priority Data
Jan. 20, 2017 (JP) .............................. JP2017-008685
Nov. 9, 2017 (JP) .............................. JP2017-216756

(51) Int. Cl.
C08G 73/14 (2006.01)
C08L 79/08 (2006.01)
G02B 1/04 (2006.01)
(52) U.S. Cl.
CPC .............. C08L 79/08 (2013.01); C08G 73/14 (2013.01); G02B 1/04 (2013.01)
(58) Field of Classification Search
CPC ....... C08L 79/08; C08G 73/14; C08J 2379/08
See application file for complete search history.

(56) References Cited

U.S. PATENT DOCUMENTS

2014/0144324 A1    5/2014  Yamanaka et al.
2016/0039977 A1*   2/2016  Cho ........................ C08G 69/32
                                                            525/432
(Continued)

FOREIGN PATENT DOCUMENTS

JP         2003-73474 A      3/2003
JP         2009-13165 A      1/2009
(Continued)

OTHER PUBLICATIONS

Ghanwat et al (Soluble Tetraphenylthiophene containing poly (amide-imide)s: Synthesis and characterization, International Journal of Pharmaceutical Science Invention, vol. 4, Issue 2, , pp. 49-56, published on Feb. 2015.*

(Continued)

Primary Examiner — Gregory Listvoyb
(74) Attorney, Agent, or Firm — Birch, Stewart, Kolasch & Birch, LLP

(57) ABSTRACT

An object of the present invention is to provide a polyamideimide resin for an optical member having both high flexibility and bending resistance, and in particular, a polyamideimide resin for a front plate of an image display apparatus, and an optical member such as a front plate containing the polyamideimide resin.

A polyamideimide resin having constitutional units represented by formula (1) and formula (2):

[Chem. 1]

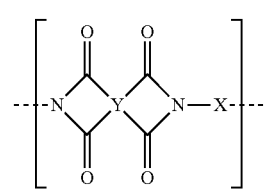

in formula (1) and formula (2), X and Z each independently represent a divalent organic group,
Y represents a tetravalent organic group, and
at least a part of Z is constitutional unit represented by formula (3):

[Chem. 2]

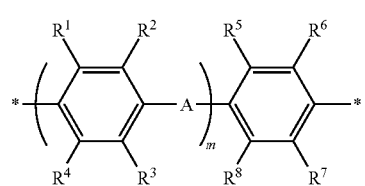

in formula (3), $R^1$ to $R^8$ each independently represent a hydrogen atom, an alkyl group having 1 to 6 carbon atoms or an aryl group having 6 to 12 carbon atoms, and the hydrogen atoms contained in $R^1$ to $R^8$ may be each independently substituted with a halogen atom, (Continued)

A represents —O—, —S—, —CO— or —NR$^9$—, and R$^9$ represents a hydrocarbon group having 1 to 12 carbon atoms which may be substituted with a halogen atom,
m is an integer of 1 to 4, and
* represents a bonding hand.

8 Claims, No Drawings

(56) References Cited

U.S. PATENT DOCUMENTS

| | | | |
|---|---|---|---|
| 2016/0194448 A1* | 7/2016 | Song | C08G 73/1042 |
| | | | 428/337 |
| 2016/0319076 A1* | 11/2016 | Ju | C08G 73/14 |
| 2017/0329062 A1 | 11/2017 | Nakajima et al. | |

FOREIGN PATENT DOCUMENTS

| | | |
|---|---|---|
| JP | 2009-163217 A | 7/2009 |
| JP | 2014-128787 A | 7/2014 |
| JP | 2017-203984 A | 11/2017 |
| WO | WO 2010/041644 A1 | 4/2010 |

OTHER PUBLICATIONS

International Search Report issued in PCT/JP2018/000804 (PCT/ISA/210), dated Mar. 27, 2018.
English translation of Chinese Office Action issued in the corresponding Chinese Patent Application No. 201880007377.6 dated Apr. 9, 2021.

* cited by examiner

POLYAMIDEIMIDE RESIN AND OPTICAL MEMBER INCLUDING POLYAMIDEIMIDE RESIN

TECHNICAL FIELD

The present invention relates to a polyamideimide resin and an optical member including the polyamideimide resin.

BACKGROUND ART

Currently, image display apparatuses such as liquid crystal display devices or organic EL display devices are widely used in various applications such as mobile phones or smart watches as well as televisions. As these applications expand, an image display apparatus (flexible display) having flexible characteristics is required.

An image display apparatus includes a constituent member such as a polarizing plate, a retardation plate, and a front plate, in addition to display devices such as a liquid crystal display device or an organic EL display device. All these constituent members need to have flexibility in order to achieve a flexible display.

Up to now, glass has been used as the front plate. Glass has high transparency and can exhibit high hardness depending on the type of glass, but is very rigid and fragile, so it is difficult to use glass as a front plate material of the flexible display.

Therefore, the use of polymer materials has been studied as a material to replace glass. The front plate made of a polymer material is likely to exhibit flexible characteristics, and thus can be expected to be used in various applications. There are various resins as the resin having flexibility, and one of them is a polyamideimide resin. The polyamideimide resin is used in various applications in terms of transparency or heat resistance (Patent Document 1).

PRIOR ART DOCUMENT

Patent Document

Patent Document 1: JP-A-2010-150552

SUMMARY OF THE INVENTION

Problems to be Solved by the Invention

When the flexible display is bent, all the constituent members are bent. If flexibility of each constituent member is insufficient, other constituent members may be damaged. Therefore, high flexibility is also required for the front plate which is one of the constituent members. At the same time, after the front plate is bent, there is a problem in visibility of the display if a folding wrinkle is left on the surface thereof, so the front plate needs to have high bending resistance.

Accordingly, an object of the present invention is to provide a polyamideimide resin for an optical member having both high flexibility and high bending resistance, and in particular, a polyamideimide resin for a front plate of an image display apparatus, and an optical member such as a front plate containing the polyamideimide resin.

Means for Solving the Problems

As a result of intensive studies to solve the above problems, the present inventors have completed the present invention.

That is, the present invention provides the following preferred embodiments.

[1] A polyamideimide resin having constitutional units represented by formula (1) and formula (2):

[Chem. 1]

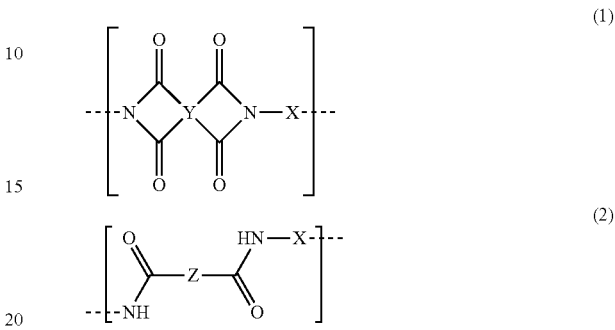

[Chem. 2]

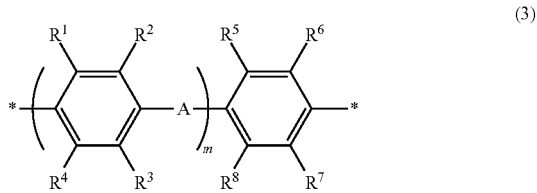

in formula (1) and formula (2), X and Z each independently represent a divalent organic group,
Y represents a tetravalent organic group, and
at least a part of Z is constitutional unit represented by formula (3):

in formula (3), $R^1$ to $R^8$ each independently represent a hydrogen atom, an alkyl group having 1 to 6 carbon atoms, or an aryl group having 6 to 12 carbon atoms, and the hydrogen atoms contained in $R^1$ to $R^8$ may be each independently substituted with a halogen atom,
A represents —O—, —S—, —CO— or —$NR^9$—, and $R^9$ represents a hydrocarbon group having 1 to 12 carbon atoms which may be substituted with a halogen atom,
m is an integer of 1 to 4, and
* represents a bonding hand.

[2] The polyamideimide resin according to [1], in which a content ratio of the constitutional unit represented by formula (3) is 3 mol % or more and 90 mol % or less, with respect to a total of Y and Z.

[3] The polyamideimide resin according to [1], in which 5 mol % or more and 100 mol % or less of Z is represented by formula (3).

[4] The polyamideimide resin according to [1], in which a ratio of the constitutional unit represented by formula (3) is 3 mol % or more and 90 mol % or less, with respect to a total of the constitutional unit represented by formula (1) and the constitutional unit represented by formula (2).

[5] The polyamideimide resin according to any one of [1] to [4], in which a content ratio of the constitutional unit represented by formula (1) is 10 mol % or more and 90 mol % or less, with respect to the total of the constitutional unit represented by formula (1) and the constitutional unit represented by formula (2).

[6] The polyamideimide resin according to any one of [1] to [5], in which at least a part of X is a constitutional unit represented by formula (4):

[Chem. 3]

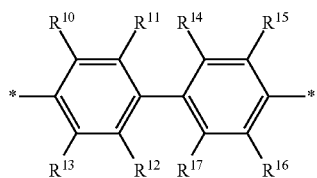
(4)

in formula (4), $R^{10}$ to $R^{17}$ each independently represent a hydrogen atom, an alkyl group having 1 to 6 carbon atoms, or an aryl group having 6 to 12 carbon atoms, and the hydrogen atoms contained in $R^{10}$ to $R^{17}$ may be each independently substituted with a halogen atom, and
* represents a bonding hand.

[7] The polyamideimide resin according to any one of [1] to [6], in which at least a part of Y is a constitutional unit represented by formula (5):

[Chem. 4]

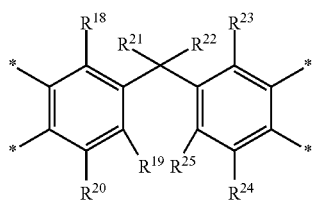
(5)

in formula (5) $R^{18}$ to $R^{25}$ each independently represent a hydrogen atom, an alkyl group having 1 to 6 carbon atoms, or an aryl group having 6 to 12 carbon atoms, and the hydrogen atoms contained in $R^{18}$ to $R^{25}$ may be each independently substituted with a halogen atom, and * represents a bonding hand.

[8] The polyamideimide resin according to any one of [1] to [7], in which a glass transition temperature (Tg) calculated by tan δ in DMA measurement is less than 380° C.

[9] An optical member including the polyamideimide resin according to any one of [1] to [8].

[10] An image display apparatus including the optical member according to [9].

Effect of the Invention

According to the present invention, a polyamideimide resin for an optical member having both high flexibility and high bending resistance, and in particular, a polyamideimide resin for a front plate of an image display apparatus, and an optical member such as a front plate including the polyamideimide resin can be provided. In addition, according to the present invention, an optical member having excellent surface hardness can be provided.

MODE FOR CARRYING OUT THE INVENTION

Hereinafter, embodiments of the present invention will be described in detail. In addition, the scope of the present invention is not limited to the embodiments described herein, and various modifications can be made without departing from the spirit of the present invention.

The polyamideimide resin which is an embodiment of the present invention has a constitutional unit represented by formula (1) and a constitutional unit represented by formula (2).

[Chem. 5]

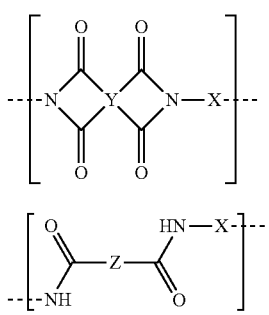

(1)

(2)

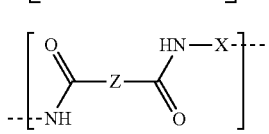

In formula (2), Z each independently represents a divalent organic group. The polyamideimide resin which is an embodiment of the present invention may contain a plurality of types of Z, and the plurality of types of Z may be identical to or different from each other. At least a part of Z is a constitutional unit represented by formula (3).

[Chem. 6]

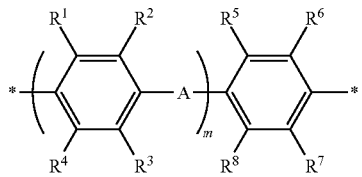
(3)

in formula (3), $R^1$ to $R^8$ each independently represent a hydrogen atom, an alkyl group having 1 to 6 carbon atoms, or an aryl group having 6 to 12 carbon atoms, and the hydrogen atoms contained in $R^1$ to $R^8$ may be each independently substituted with a halogen atom,
A represents —O—, —S—, —CO—, or —NR$^9$—, and R$^9$ represents a hydrocarbon group having 1 to 12 carbon atoms which may be substituted with a halogen atom,
m is an integer of 1 to 4, and
* represents a bonding hand.

In formula (3), A each independently represent —O—, —S—, —CO—, or —NR$^9$—, preferably —O— or —S—, and more preferably —O— in terms of flexibility of the optical member including the polyamideimide resin. $R^1$ to $R^8$ each independently represent a hydrogen atom, an alkyl group having 1 to 6 carbon atoms, or an aryl group having 6 to 12 carbon atoms, preferably a hydrogen atom or an alkyl group having 1 to 6 carbon atoms, and more preferably a hydrogen atom or an alkyl group having 1 to 3 carbon atoms, and still more preferably a hydrogen atom in terms of flexibility and surface hardness of the optical member including the polyamideimide resin. Here, the hydrogen atoms contained in $R^1$ to $R^8$ may be each independently substituted with a halogen atom. $R^9$ represents a hydrocarbon group of 1 to 12 carbon atoms which may be substituted with a halogen atom.

In formula (3), m is an integer in the range of 1 to 4, and if m is within this range, the flexibility of the optical member is good. In addition, in formula (3), m is preferably an integer in the range of 1 to 3, more preferably 1 or 2, and still more preferably 1. If m is within this rage, flexibility of the optical member is good, and availability of raw materials is relatively good.

In a preferred embodiment of the present invention, formula (3) is a constitutional unit represented by formula (3'), that is, at least a part of a plurality of Z is a constitutional unit represented by formula (3'). In this case, the optical member including the polyamideimide resin can exhibit high surface hardness, and at the same time have a low elastic modulus and high flexibility.

[Chem. 7]

(3')

In a preferred embodiment of the present invention, the content ratio of the constitutional unit represented by formula (3) is preferably 3 mol % or more, more preferably 5 mol % or more, still more preferably 7 mol % or more, further still more preferably 9 mol % or more, particularly preferably 15 mol % or more, and very preferably 30 mol % or more, but preferably 90 mol % or less, more preferably 87 mol % or less, still more preferably 85 mol % or less, particularly preferably 83 mol % or less, and very preferably 80 mol % or less, with respect to the total of Y and Z in the polyamideimide resin. If the content ratio of the constitutional unit represented by formula (3) is equal to or greater than the lower limit, with respect to the total of Y and Z in the polyamideimide resin, the optical member including the polyamideimide resin can have a low elastic modulus and excellent flexibility, and at the same time can exhibit high surface hardness. If the content ratio of the constitutional unit represented by formula (3) is equal to or less than the upper limit, with respect to the total of Y and Z in the polyamideimide resin, the thickening by hydrogen bonds between amide bonds derived from formula (3) can be suppressed, thereby suppressing the viscosity of a polyamideimide varnish to be described below, and facilitating a processing of the optical member. In addition, the content ratio of the constitutional unit represented by formula (3) can be measured, for example, using $^1$H-NMR, or can be calculated from the feed ratio of the raw materials.

In a preferred embodiment of the present invention, the constitutional unit of, preferably 5 mol % or more, more preferably 7 mol % or more, still more preferably 9 mol % or more, and particularly preferably 11 mol % or more of Z in the polyamideimide resin is represented by formula (3). If the constitutional unit having the lower limit or more of Z in the polyamideimide resin is represented by formula (3), the optical member including the polyamideimide resin can exhibit high surface hardness, and at the same time can have a low elastic modulus and high flexibility. In addition, the constitutional unit of 100 mol % or less of Z in the polyamideimide resin is preferably represented by formula (3). In addition, the content ratio of the constitutional unit represented by formula (3) in the polyamideimide resin can be measured, for example, using $^1$H-NMR or can be calculated from the feed ratio of the raw materials.

In a preferred embodiment of the present invention, the ratio of the constitutional unit represented by formula (3) is preferably 3 mol % or more, more preferably 5 mol % or more, still more preferably 7 mol % or more, further still more preferably 9 mol % or more, particularly preferably 15 mol % or more, and very preferably 30 mol % or more, but preferably 90 mol % or less, more preferably 87 mol % or less, still more preferably 85 mol % or less, particularly preferably 83 mol % or less, and very preferably 80 mol % or less, with respect to the total of the constitutional unit represented by formula (1) and the constitutional unit represented by formula (2) in the polyamideimide resin. If the ratio of the constitutional unit represented by formula (3) is equal to or greater than the lower limit, with respect to the total of the constitutional unit represented by formula (1) and the constitutional unit represented by formula (2) in the polyamideimide resin, the optical member including the polyamideimide resin can have a low elastic modulus and excellent flexibility, and at the same time can exhibit high surface hardness. If the ratio of the constitutional unit represented by formula (3) is equal to or less than the upper limit, with respect to the total of the constitutional unit represented by formula (1) and the constitutional unit represented by formula (2) in the polyamideimide resin, the thickening due to hydrogen bonds between amide bonds derived from formula (3) can be suppressed, thereby suppressing the viscosity of the polyamideimide varnish to be described below, and facilitating the processing of the optical member. In addition, the content ratio of the constitutional unit represented by formula (3) can be measured, for example, using $^1$H-NMR, or can be calculated from the feed ratio of the raw materials.

In formula (1) and formula (2), X each independently represent a divalent organic group, and preferably an organic group in which hydrogen atoms in the divalent organic group may be substituted with a hydrocarbon group or a fluorine-substituted hydrocarbon group. In addition, X in formula (1) may be identical to or different from X in formula (2). The polyamideimide resin which is an embodiment of the present invention may contain a plurality of types of X, and the plurality of types of X may be identical to or different from each other. Examples of X include a group represented by the following formula (10), formula (11), formula (12), formula (13), formula (14), formula (15), formula (16), formula (17), or formula (18); a group in which hydrogen atoms in the group represented by these formulas are substituted with a methyl group, a fluoro group, a chloro group, or a trifluoromethyl group; and a chain hydrocarbon group having 6 or less carbon atoms.

[Chem. 8]

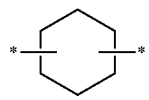

(10)

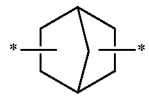

(11)

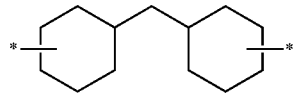

(12)

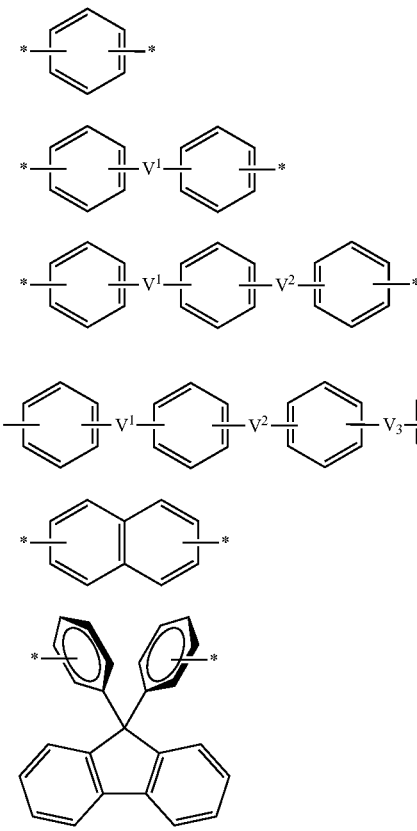

in formula (10), formula (11), formula (12), formula (13), formula (14), formula (15), formula (16), formula (17), or formula (18), * represents a bonding hand, and $V^1$ to $V^3$ each independently represent a single bond, —O—, —S—, —CH$_2$—, —CH$_2$—CH$_2$—, —CH(CH$_3$)—, —C(CH$_3$)$_2$—, —C(CF$_3$)$_2$—, —SO$_2$—, or —CO—.

A bonding position of $V^1$ and $V^2$ to each ring and a bonding position of $V^2$ and $V^3$ to each ring are preferably meta position or para position to each ring, and more preferably para position to each ring.

Among the groups represented by formula (10), formula (11), formula (12), formula (13), formula (14), formula (15), formula (16), formula (17), or formula (18), the group represented by formula (13), formula (14), formula (15), formula (16), or formula (17) is preferable, and the group represented by formula (14), the formula (15) or the formula (16) is more preferable in terms of surface hardness and flexibility of the optical member including the polyamide-imide resin. Further, $V^1$ to $V^3$ are preferably each independently a single bond, —O—, or —S—, and more preferably a single bond or —O— in terms of surface hardness and flexibility of the optical member including the polyamide-imide resin.

In a preferred embodiment of the present invention, at least a part of a plurality of X in formula (1) and formula (2) is a constitutional unit represented by formula (4). If at least a part of a plurality of X in formula (1) and formula (2) is a group represented by formula (4), the optical member including the polyamideimide resin can exhibit high transparency, and at the same time high surface hardness.

[Chem. 9]

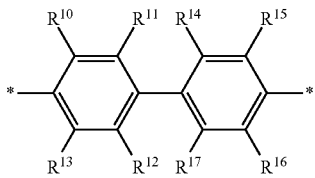

in formula (4), $R^{10}$ to $R^{17}$ each independently represent a hydrogen atom, an alkyl group having 1 to 6 carbon atoms, or an aryl group having 6 to 12 carbon atoms, and the hydrogen atoms contained in $R^{10}$ to $R^{17}$ may be each independently substituted with a halogen atom, and * represents a bonding hand.

In formula (4), $R^{10}$ to $R^{17}$ each independently represent a hydrogen atom, an alkyl group having 1 to 6 carbon atoms, or an aryl group having 6 to 12 carbon atoms, preferably a hydrogen atom or an alkyl group having 1 to 6 carbon atoms, and more preferably a hydrogen atom or an alkyl group having 1 to 3 carbon atoms, in which the hydrogen atoms contained in $R^{10}$ to $R^{17}$ may be each independently substituted with a halogen atom. $R^{10}$ to $R^{17}$ are still more preferably each independently a hydrogen atom, a methyl group, a fluoro group, a chloro group, or a trifluoromethyl group, and particularly preferably a hydrogen atom or a trifluoromethyl group in term of surface hardness, flexibility and transparency of the optical member including the polyamideimide resin.

In a preferred embodiment of the present invention, the constitutional unit represented by formula (4) is a constitutional unit represented by formula (4'), that is, at least a part of a plurality of X is a constitutional unit represented by formula (4'). In this case, the optical member including the polyamideimide resin can exhibit high transparency, and at the same time can improve a solubility of the polyamideimide resin in a solvent by a fluorine element-containing skeleton, suppress the viscosity of the polyamideimide varnish to a low level, and facilitate the processing of the optical member.

[Chem. 10]

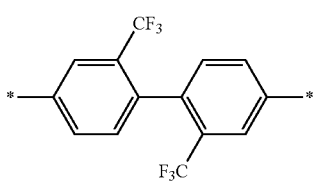

in formula (4), * represents a bonding hand.

In a preferred embodiment of the present invention, the constitutional unit of, preferably 30 mol % or more, more preferably 50 mol % or more, still more preferably 60 mol % or more, and particularly preferably 70 mol % or more of X in the polyamideimide resin is represented by formula (4), and particularly formula (4'). If X within the above range in the above polyamideimide resin is represented by formula (4), particularly formula (4'), the optical member including the polyamideimide resin can exhibit high transparency, and at the same time can improve a solubility of the polyamideimide resin in a solvent by a fluorine element-containing skeleton, suppress the viscosity of the polyamideimide varnish to a low level, and also facilitate the processing of the optical member. In addition, the constitutional unit of 100 mol % or less of X in the polyamideimide resin is preferably represented by formula (4), particularly formula (4'). X in the polyamideimide resin may be formula (4), particularly formula (4'). The content ratio of the constitutional unit represented by formula (4) of X in the polyamideimide resin can be measured, for example, using $^1$H-NMR or can be calculated from the feed ratio of the raw materials.

In formula (1), Y each independently represents a tetravalent organic group, and preferably an organic group in which hydrogen atoms in the tetravalent organic group may be substituted with a hydrocarbon group or a fluorine-substituted hydrocarbon group. The polyamideimide resin which is an embodiment of the present invention may contain a plurality of types of Y, and the plurality of types of Y may be identical to or different from each other. Examples of Y include a group represented by formula (20), formula (21), formula (22), formula (23), formula (24), formula (25), formula (26), formula (27), formula (28), or formula (29); a group in which hydrogen atoms in the group represented by these formulas are substituted with a methyl group, a fluoro group, a chloro group, or a trifluoromethyl group; and a tetravalent chain hydrocarbon group having 6 or less carbon atoms.

[Chem. 11]

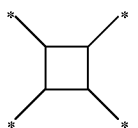
(20)

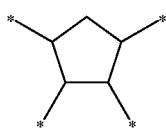
(21)

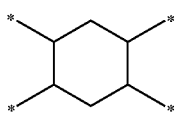
(22)

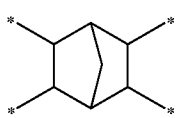
(23)

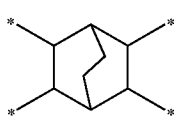
(24)

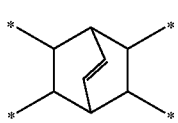
(25)

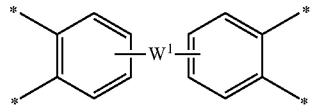
(26)

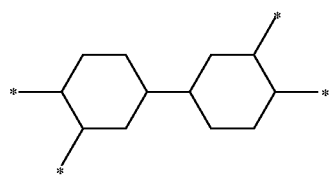
(27)

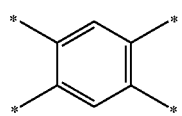
(28)

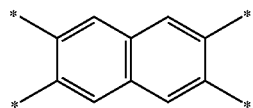
(29)

in formulas (20) to (29),
* represents a bonding hand, and
$W^1$ represents a single bond, —O—, —CH$_2$—, —CH$_2$—CH$_2$—, —CH(CH$_3$)—, —C(CH$_3$)$_2$—, —C(CF$_3$)$_2$—, —Ar—, —SO$_2$—, —CO—, —O—Ar—O—, —Ar—O—Ar—, —Ar—CH$_2$—Ar—, —Ar—C(CH$_3$)$_2$—Ar—, or —Ar—SO$_2$—Ar—. Ar represents an arylene group in which hydrogen atoms may be substituted with a fluorine atom and which has 6 to 20 carbon atoms, and specific examples thereof include a phenylene group.

Among the groups represented by formula (20), formula (21), formula (22), formula (23), formula (24), formula (25), formula (26), formula (27), formula (28), or formula (29), the group represented by formula (26), formula (28), or formula (29) is preferable, and the group represented by formula (26) is more preferable in terms of surface hardness and flexibility of the optical member including the polyamideimide resin. In terms of facilitating the suppression of the yellow index, preferably, examples thereof include a group represented by formula (20), formula (21), formula (22), formula (23), formula (24), formula (25), formula (26), or formula (27); and a group in which hydrogen atoms are substituted with a methyl group, a fluoro group, a chloro group, or a trifluoromethyl group. In addition, $W^1$ is preferably each independently single bond, —O—, —CH$_2$—, —CH$_2$—CH$_2$—, —CH(CH$_3$)—, —C(CH$_3$)$_2$—, or —C(CF$_3$)$_2$—, more preferably each independently a single bond, —O—, —CH$_2$—, —CH(CH$_3$)—, —C(CH$_3$)$_2$—, or —C(CF$_3$)$_2$—, still more preferably a single bond, —O—, —C(CH$_3$)$_2$— or —C(CF$_3$)$_2$—, and particularly preferably each independently —O— or —C(CF$_3$)$_2$— in terms of surface hardness and flexibility of the optical member including the polyamideimide resin.

In a preferred embodiment of the present invention, at least a part of a plurality of Y in formula (1) is a constitutional unit represented by formula (5). If at least a part of the plurality of Y in formula (1) is a group represented by formula (5), the optical member including the polyamideimide resin can exhibit high transparency, and at the same time can improve a solubility of the polyamideimide resin in a solvent derived from a highly flexible skeleton, suppress the viscosity of the polyamideimide varnish to a low level, and also facilitate the processing of the optical member.

[Chem. 12]

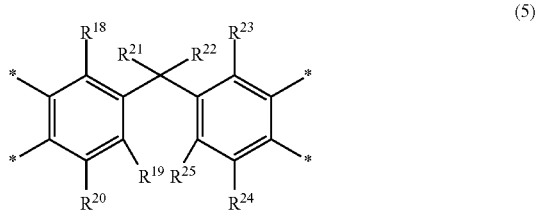

(5)

in formula (5), $R^{18}$ to $R^{25}$ each independently represent a hydrogen atom, an alkyl group having 1 to 6 carbon atoms or an aryl group having 6 to 12 carbon atoms, and the hydrogen atoms contained in $R^{18}$ to $R^{25}$ may be each independently substituted with a halogen atom, and
* represents a bonding hand.

In formula (5), $R^{18}$ to $R^{25}$ each independently represent a hydrogen atom, an alkyl group having 1 to 6 carbon atoms, or an aryl group having 6 to 12 carbon atoms, preferably a hydrogen atom or an alkyl group having 1 to 6 carbon atoms, and more preferably a hydrogen atom or an alkyl group having 1 to 3 carbon atoms, in which the hydrogen atoms contained in $R^{18}$ to $R^{25}$ may be each independently substituted with a halogen atom. $R^{18}$ to $R^{25}$ are still more preferably each independently a hydrogen atom, a methyl group, a fluoro group, a chloro group, or a trifluoromethyl group, and particularly preferably a hydrogen atom or a trifluoromethyl group in term of surface hardness and flexibility of the optical member including the polyamideimide resin.

In a preferred embodiment of the present invention, the constitutional unit represented by formula (5) is a group represented by formula (5'), that is, at least a part of a plurality of Y is a constitutional unit represented by formula (5'). In this case, the optical member including the polyamideimide resin can have high transparency.

[Chem. 13]

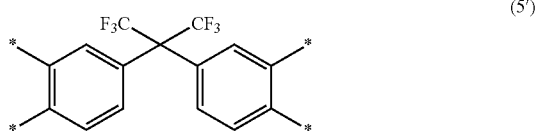

(5')

in formula (5'), * represents a bonding hand.

In a preferred embodiment of the present invention, the constitutional unit of, preferably 50 mol % or more, more preferably 60 mol % or more, still more preferably 70 mol % or more of Y in the polyamideimide resin is represented by formula (5), particularly formula (5'). If Y within the above range in the above polyamideimide resin is represented by formula (5), particularly formula (5'), the optical member including the polyamideimide resin can have high transparency, improve a solubility of the polyamideimide resin in a solvent by a fluorine element-containing skeleton, suppress the viscosity of the polyamideimide varnish to a low level, and also facilitate the manufacture of the optical member. In addition, the constitutional unit of 100 mol % or less of Y in the polyamideimide resin is preferably represented by formula (5), particularly formula (5'). Y in the polyamideimide resin may be formula (5), particularly formula (5'). The content ratio of the constitutional unit represented by formula (5) of Y in the polyamideimide resin can be measured, for example, using $^1$H-NMR or can be calculated from the feed ratio of the raw materials.

The polyamideimide resin preferably has a weight average molecular weight (Mw) of 5,000 or more, more preferably 10,000 or more, more preferably 50,000 or more, particularly preferably 70,000 or more, and most preferably 100,000 or more, but preferably 800,000 or less, more preferably 600,000 or less, more preferably 500,000 or less, and particularly preferably 450,000 or less. If the weight average molecular weight (Mw) of the polyamideimide resin is equal to or greater than the lower limit, the optical member including the polyamideimide resin has better bending resistance. If the weight average molecular weight (Mw) of the polyamideimide resin is equal to or less than the upper limit, the viscosity of the polyamideimide varnish can be suppressed to a low level, and also the optical member, particularly the optical film, can be easily stretched, so the processability is good. In addition, in the present invention, the weight average molecular weight (Mw) can be determined, for example by performing GPC measurement and converting it into standard polystyrene. Specifically, the weight average molecular weight can be determined by the method described in the examples.

In the polyamideimide resin, the content ratio of the constitutional unit represented by formula (1) is preferably 10 mol % or more, more preferably 15 mol % or more, still more preferably 18 mol % or more, and further still more preferably 20 mol % or more, but preferably 90 mol % or less, more preferably 70 mol % or less, still more preferably 60 mol % or less, and particularly preferably 50 mol % or less, with respect to the total of the constitutional unit represented by formula (1) and the constitutional unit represented by formula (2). In the polyamideimide resin, if the content ratio of the constitutional unit represented by formula (1) is equal to or greater than the lower limit, the thickening by hydrogen bonds between amide bonds in formula (2) can be suppressed, thereby reducing the viscosity of the polyamideimide varnish, and facilitating the manufacture of the optical member. In the polyamideimide resin, if the content ratio of the constitutional unit represented by formula (1) is equal to or less than the upper limit, the optical member including the polyamideimide resin exhibit high surface hardness. In addition, the above ratio can be measured, for example, using $^1$H-NMR or can be calculated from the feed ratio of the raw materials.

In the polyamideimide resin, the content ratio of the constitutional unit represented by formula (2) is preferably 20 mol % or more, more preferably 30 mol % or more, still more preferably 40 mol % or more, and particularly preferably 50 mol % or more, but preferably 80 mol % or less, more preferably 70 mol % or less, still more preferably 60 mol % or less, and particularly preferably 50 mol % or less, with respect to the total of the constitutional unit represented by formula (1) and the constitutional unit represented by formula (2)< In the polyamideimide resin, if the content ratio of the constitutional unit represented by formula (1) is equal to or less than the upper limit, the thickening by hydrogen bonds between amide bonds in formula (2) can be suppressed, thereby reducing the viscosity of the polyamideimide varnish, and facilitating the manufacture of the optical member. In the polyamideimide resin, if the content ratio of the constitutional unit represented by formula (1) is equal to or greater than the lower limit, the optical member including the polyamideimide resin exhibits high surface hardness. In addition, the above ratio can be measured, for example, using $^1$H-NMR or can be calculated from the feed ratio of the raw materials.

The polyamideimide resin preferably has a glass transition temperature (Tg) calculated by tan δ in dynamic viscoelasticity measurement (DMA measurement) of less than 380° C., more preferably 379° C. or less, and still more preferably 378° C. or less, for example, 370° C. or less. If the glass transition temperature (Tg) of the polyamideimide resin is less than (or equal to or less than) the upper limit, the optical member including the polyamideimide resin can exhibit high surface hardness, and at the same time can have a low elastic modulus and high flexibility. In order to control the glass transition temperature to the above range, the monomer constituting the polyamideimide preferably includes a monomer having a divalent group capable of giving flexibility to the polyamideimide film obtained by film formation; specific examples of the divalent group capable of giving flexibility include —O—, —CH$_2$—, —CF$_2$—, —C(CH$_3$)$_2$—, —C(CF$_3$)$_2$—, and the monomer having the divalent group capable of giving flexibility more preferably includes a monomer having a divalent group containing —O—. In addition, the polyamideimide resin has the glass transition temperature (Tg) usually of 300° C. or more. The method of calculating the glass transition temperature by the tan δ in the dynamic viscoelasticity measurement (DMA measurement) can be carried out specifically as in the examples.

The polyamideimide resin may comprise a constitutional unit represented by formula (10-2) and/or a constitutional unit represented by formula (11-2), in addition to the constitutional unit represented by formula (1) and the constitutional unit represented by formula (2).

[Chem. 14]

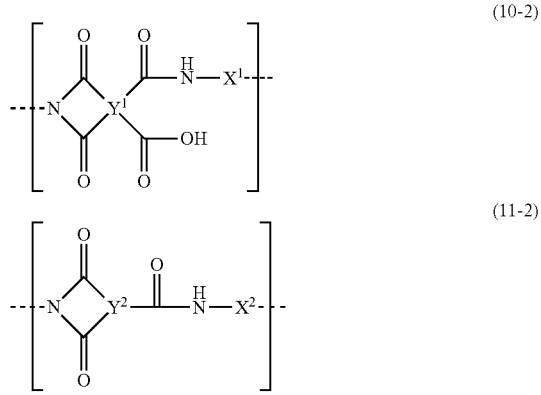

In formula (10-2), $Y^1$ is each independently a tetravalent organic group, and preferably an organic group in which hydrogen atoms in the tetravalent organic group may be substituted with a hydrocarbon group or a fluorine-substituted hydrocarbon group. Examples of $Y^1$ include a group represented by formula (20), formula (21), formula (22), formula (23), formula (24), formula (25), formula (26), formula (27), formula (28), or formula (29); and a tetravalent chain hydrocarbon group having 6 or less carbon atoms. The polyamideimide resin which is an embodiment of the present invention may contain a plurality of types of $Y^1$, and the plurality of types of $Y^1$ may be identical to or different from each other.

In formula (11-2), $Y^2$ is trivalent organic group, and preferably an organic group in which hydrogen atoms in the trivalent organic group may be substituted with a hydrocarbon group or a fluorine-substituted hydrocarbon group.

Examples of $Y^2$ include a group in which any one of a bonding hand of the group represented by formula (20), formula (21), formula (22), formula (23), formula (24), formula (25), formula (26), formula (27), formula (28), or formula (29) is substituted with a hydrogen atom, and a trivalent chain hydrocarbon group having 6 or less carbon atoms. The polyamideimide resin which is an embodiment of the present invention may contain a plurality of types of $Y^2$, and the plurality of types of $Y^2$ may be identical to or different from each other.

In formula (10-2) and formula (11-2), $X^1$ and $X^2$ are each independently a divalent organic group, and preferably an organic group in which hydrogen atoms in the divalent organic group may be substituted with a hydrocarbon group or a fluorine-substituted hydrocarbon group. Examples of $X^1$ and $X^2$ include a group represented by formula (10), formula (11), formula (12), formula (13), formula (14), formula (15), formula (16), formula (17), or formula (18); a group in which hydrogen atoms in the groups represented by these formulas are substituted with a methyl group, a fluoro group, a chloro group, or a trifluoromethyl group; and a chain hydrocarbon group having 6 or less carbon atoms.

In an embodiment of the present invention, the polyamideimide resin is composed of a constitutional unit represented by formula (1) and a constitutional unit represented by formula (2), and optionally the constitutional unit represented by formula (10-2) and the constitutional unit represented by formula (11-2). In addition, in terms of flexibility and surface hardness of the optical member including the polyamideimide resin, in the polyamideimide resin, the content ratio of the constitutional unit represented by formula (1) and the constitutional unit represented by formula (2) is preferably 80% or more, more preferably 90% or more, and still more preferably 95% or more, based on the total constitutional units represented by formula (1) and formula (2), and optionally formula (10-2) and formula (11-2). Further, in the polyamideimide resin, the content ratio of the constitutional unit represented by formula (1) and the constitutional unit represented by formula (2) is usually 100% or less, based on the total constitutional unit represented by formula (1) or formula (2), and optionally formula (10-2) or formula (11-2). In addition, the above content ratio can be measured, for example, using $^1$H-NMR or can be calculated from the feed ratio of the raw materials.

The polyamideimide resin can be produced, for example, by using a tetracarboxylic acid compound, a dicarboxylic acid compound, and a diamine compound as described below, as main raw materials. Here, a dicarboxylic acid compound includes at least a compound represented by formula (3").

[Chem. 15]

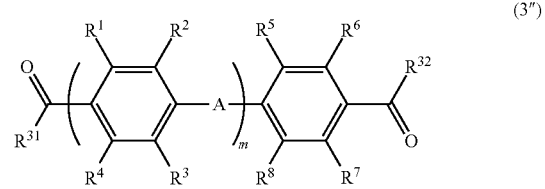

in formula (3"), $R^1$ to $R^8$ each independently represent a hydrogen atom, an alkyl group having 1 to 6 carbon atoms or an aryl group having 6 to 12 carbon atoms, and the hydrogen atoms contained in $R^1$ to $R^8$ may be each independently substituted with a halogen atom, A represents —O—, —S—, —CO— or —NR$^9$—, and $R^9$ represents a hydrocarbon group having 1 to 12 carbon atoms which may be substituted with a halogen atom, m is an integer of 1 to 4, and $R^{31}$ and $R^{32}$ are each independently —OH or —Cl.

In a preferred embodiment, the dicarboxylic acid compound is a compound represented by formula (3") in which A is —O—. In addition, in another preferred embodiment, the dicarboxylic acid compound is a compound represented by formula (3") in which $R^{32}$ is —Cl. In addition, instead of a diamine compound, a diisocyanate compound may be used.

Examples of the tetracarboxylic acid compound used in the synthesis of the polyamideimide resin include an aromatic tetracarboxylic acid and an anhydride thereof, and preferably an aromatic tetracarboxylic acid compound such as a dianhydride thereof; and an aliphatic tetracarboxylic acid and an anhydride thereof, and preferably an aliphatic tetracarboxylic acid compound such as a dianhydride thereof. The tetracarboxylic acid compound may be used alone or in combination of two or more. The tetracarboxylic acid compound may be a tetracarboxylic acid compound analog such as an acid chloride compound in addition to dianhydride. These can be used alone or in combination of two or more.

Examples of the aromatic tetracarboxylic dianhydride include non-condensed polycyclic aromatic tetracarboxylic dianhydride, monocyclic aromatic tetracarboxylic dianhydride, and condensed polycyclic aromatic tetracarboxylic anhydride. Specific examples of the non-condensed polycyclic aromatic tetracarboxylic dianhydride include 4,4'-oxydiphthalic dianhydride (also referred to as OPDA), 3,3',4,4'-benzophenone tetracarboxylic dianhydride, 2,2',3,3'-benzophenone tetracarboxylic dianhydride, 3,3',4,4'-biphenyltetracarboxylic dianhydride (also referred to as BPDA), 2,2',3,3'-biphenyltetracarboxylic dianhydride, 3,3',4,4'-diphenylsulfone tetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 4,4'-(hexafluoroisopropylidene)diphthalic dianhydride (also referred to as 6FDA), 1,2-bis(2,3-dicarboxyphenyl)ethane dianhydride, 1,1-bis(2,3-dicarboxyphenyl)ethane dianhydride, 1,2-bis(3,4-dicarboxyphenyl)ethane dianhydride, 1,1-bis(3,4-dicarboxyphenyl)ethane dianhydride, bis(3,4-dicarboxyphenyl)methane dianhydride, bis(2,3-dicarboxyphenyl)methane dianhydride, 4,4'-(p-phenylenedioxy)diphthalic dianhydride, and 4,4'-(m-phenylenedioxy)diphthalic dianhydride. In addition, examples of the monocyclic aromatic tetracarboxylic dianhydride include 1,2,4,5-benzenetetracarboxylic dianhydride, examples of the condensed polycyclic aromatic tetracarboxylic dianhydride include 1,2,4,5-benzenetetracarboxylic dianhydride, and examples of the condensed polycyclic aromatic tetracarboxylic dianhydride include 2,3,6,7-naphthalenetetracarboxylic dianhydride. These can be used alone or in combination of two or more.

Of these, preferred are 4,4'-oxydiphthalic dianhydride, 3,3',4,4'-benzophenone tetracarboxylic dianhydride, 2,2',3,3'-benzophenone tetracarboxylic dianhydride, 3,3',4,4'-biphenyltetracarboxylic dianhydride, 2,2',3,3'-biphenyltetracarboxylic dianhydride, 3,3',4,4'-diphenylsulfone tetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 4,4'-(hexafluoroisopropylidene)diphthalic dianhydride, 1,2-bis(2,3-dicarboxyphenyl)ethane dianhydride, 1,1-bis(2,3-dicarboxyphenyl)ethane dianhydride, 1,2-bis(3,4-dicarboxyphenyl)ethane dianhydride, 1,1-bis(3,4-dicarboxyphenyl)ethane dianhydride, bis(3,4-dicarboxyphenyl)methane dianhydride, bis(2,3-dicarboxyphenyl)methane dianhydride, 4,4'-(p-phenylenedioxy)diphthalic dianhydride, and 4,4'-(m-phenylenedioxy)diphthalic dianhydride, and more preferred are 4,4'-oxydiphthalic dianhydride, 3,3',4,4'-biphenyltetracarboxylic dianhydride, and 4,4'-(hexafluoroisopropylidene)diphthalic dianhydride.

Examples of the aliphatic tetracarboxylic dianhydride include cyclic or acyclic aliphatic tetracarboxylic dianhydride. Cyclic aliphatic tetracarboxylic dianhydride refers to tetracarboxylic dianhydride having an alicyclic hydrocarbon structure, and specific examples thereof include cycloalkane tetracarboxylic dianhydride such as 1,2,4,5-cyclohexanetetracarboxylic dianhydride, 1,2,3,4-cyclobutane tetracarboxylic dianhydride, and 1,2,3,4-cyclopentanetetracarboxylic dianhydride, bicyclo [2.2.2] oct-7-ene-2,3,5,6-tetracarboxylic dianhydride, dicyclohexyl 3,3'-4,4'-tetracarboxylic dianhydride, and a regioisomer thereof. These can be used alone or in combination of two or more. Specific examples of the acyclic tetracarboxylic dianhydride include 1,2,3,4-butanetetracarboxylic dianhydride and 1,2,3,4-pentanetetracarboxylic dianhydride. These can be used alone or in combination of two or more. In addition, the cyclic aliphatic tetracarboxylic dianhydride and the acyclic aliphatic tetracarboxylic dianhydride may be used in combination.

Among the above tetracarboxylic dianhydride, in terms of high surface hardness, high flexibility, high bending resistance, high transparency, and low colorability of the optical member, preferred are 4,4'-oxydiphthalic dianhydride, 3,3',4,4'-benzophenone tetracarboxylic dianhydride, 3,3',4,4'-biphenyltetracarboxylic dianhydride, 2,2',3,3'-biphenyltetracarboxylic dianhydride, 3,3',4,4'-diphenylsulfone tetracarboxylic dianhydride, 2,2-bis(3,4-dicarboxyphenyl) propane dianhydride, 4,4'-(hexafluoroisopropylidene)diphthalic dianhydride and a mixture thereof, still more preferred are 4,4'-oxydiphthalic dianhydride, 3,3',4,4'-biphenyltetracarboxylic dianhydride, 4,4'-(hexafluoroisopropylidene) diphthalic dianhydride, and a mixture thereof; and still more preferred are 4,4'-(hexafluoroisopropylidene)diphthalic dianhydride.

The dicarboxylic acid compound used for synthesis of the polyamideimide resin is preferably 4,4'-oxybisbenzoic acids and/or an acid chloride compound thereof. Specifically, preferred examples thereof include 4,4'-oxybis(benzoyl chloride). In addition to 4,4'-oxybisbenzoic acid or an acid chloride compound thereof, other dicarboxylic acid compounds may be used. Examples of other dicarboxylic acid compounds include aromatic dicarboxylic acids, aliphatic dicarboxylic acids, and analogous acid chloride compounds and acid anhydrides thereof, and two or more of them may be used in combination. Specific examples thereof include terephthalic acid; isophthalic acid; naphthalene dicarboxylic acid; 4,4'-biphenyldicarboxylic acid; 3,3'-biphenyldicarboxylic acid; and a dicarboxylic acid compound of a chain hydrocarbon having 8 or less carbon atoms, a compound in which two benzoic acids are linked by a single bond, —CH$_2$—, —C(CH$_3$)$_2$—, —C(CF$_3$)$_2$—, —SO$_2$—, or phenylene group, and acid chloride compounds thereof. Specifically, preferred examples thereof include terephthaloyl chloride.

In addition, the polyamideimide resin may be obtained by further reacting a tetracarboxylic acid and a tricarboxylic acid and an anhydride and a derivative thereof, in addition to the tetracarboxylic acid compound used for synthesizing the polyamideimide, to the extent that various physical properties of the optical member including the polyamideimide resin are not impaired.

Examples of the tetracarboxylic acid include a water adduct of the anhydride of the tetracarboxylic acid compound.

Examples of the tricarboxylic acid compound include aromatic tricarboxylic acids, aliphatic tricarboxylic acids, and analogous acid chloride compounds and acid anhydrides thereof, and two or more of them may be used in combination.

Specific examples thereof include anhydrides of 1,2,4-benzenetricarboxylic acid; 2,3,6-naphthalenetricarboxylic acid-2,3-anhydride; and compounds in which phthalic anhydride and benzoic acid are linked by a single bond, —O—, —$CH_2$—, —$C(CH_3)_2$—, —$C(CF_3)_2$—, —$SO_2$—, or a phenylene group.

Examples of the diamine compound used in the synthesis of the polyamideimide resin include aliphatic diamines, aromatic diamines, and a mixture thereof. In addition, in the present embodiment, "aromatic diamine" refers to a diamine in which an amino group is directly bonded to an aromatic ring, and a part of its structure may contain an aliphatic group or other substituents. The aromatic ring may be a monocyclic ring or a condensed ring, and examples thereof include, but are not limited to, a benzene ring, a naphthalene ring, an anthracene ring and a fluorene ring. Of these, a benzene ring is preferred. In addition, "aliphatic diamines" refer to a diamine in which an amino group is directly bonded to an aliphatic ring, and a part of its structure may contain an aromatic ring or other substituents.

Examples of the aliphatic diamines include acyclic aliphatic diamines such as hexamethylene diamine, and cyclic aliphatic diamines such as 1,3-bis(aminomethyl) cyclohexane, 1,4-bis(aminomethyl) cyclohexane, norbornanediamine, and 4,4'-diaminodicyclohexylmethane. These can be used alone or in combination of two or more.

Examples of the aromatic diamines include aromatic diamines having one aromatic ring such as p-phenylenediamine, m-phenylenediamine, 2,4-toluenediamine, m-xylenediamine, p-xylenediamine, 1,5-diaminonaphthalene, and 2,6-diaminonaphthalene; aromatic diamines having two or more aromatic rings such as 4,4'-diaminodiphenylmethane, 4,4'-diaminodiphenyl propane, 4,4'-diaminodiphenyl ether (also referred to as ODA), 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 1,4-bis(4-aminophenoxy) benzene, 1,3-bis(4-aminophenoxy) benzene, 4,4'-diaminodiphenyl sulfone, bis[4-(4-aminophenoxy)phenyl] sulfone, bis[4-(3-aminophenoxy)phenyl] sulfone, 2,2-bis[4-(4-aminophenoxy)phenyl] propane, 2,2-bis[4-(3-aminophenoxy)phenyl] propane, 2,2'-dimethylbenzidine (also referred to as MB), 2,2'-bis(trifluoromethyl) benzidine (also referred to as TFMB), 4,4'-bis(4-aminophenoxy) biphenyl, 9,9-bis(4-aminophenyl) fluorene, 9,9-bis(4-amino-3-methylphenyl) fluorene, 9,9-bis(4-amino-3-chlorophenyl) fluorene, and 9,9-bis(4-amino-3-fluorophenyl) fluorine. These can be used alone or in combination of two or more.

Examples of the aromatic diamines include preferably 4,4'-diaminodiphenylmethane, 4,4'-diaminodiphenyl propane, 4,4'-diaminodiphenyl ether, 3,3'-diaminodiphenyl ether, 4,4'-diaminodiphenyl sulfone, 3,3'-diaminodiphenyl sulfone, 1,4-bis(4-aminophenoxy) benzene, bis [4-(4-aminophenoxy)phenyl] sulfone, bis [4-(3-aminophenoxy)phenyl] sulfone, 2,2-bis [4-(4-aminophenoxy)phenyl] propane, 2,2-bis [4-(3-aminophenoxy)phenyl] propane, 2,2'-dimethylbenzidine, 2,2'-bis(trifluoromethyl)-4,4'-diaminodiphenyl, and 4,4'-bis(4-aminophenoxy) biphenyl, more preferably 4,4'-diaminodiphenylmethane, 4,4'-diaminodiphenyl propane, 4,4'-diaminodiphenyl ether, 4,4'-diaminodiphenyl sulfone, 1,4-bis(4-aminophenoxy) benzene, bis [4-(4-aminophenoxy)phenyl] sulfone, 2,2-bis [4-(4-aminophenoxy) phenyl] propane, 2,2'-dimethylbenzidine, 2,2'-bis(trifluoromethyl)-4,4'-diaminodiphenyl, and 4,4'-bis(4-aminophenoxy) biphenyl. These can be used alone or in combination of two or more.

Among the diamine compounds, at least one selected from the group consisting of aromatic diamines having a biphenyl structure is preferably used in terms of high surface hardness, high flexibility, high bending resistance, high transparency and low colorability of the optical member. At least one selected from the group consisting of 2,2'-dimethylbenzidine, 2,2'-bis(trifluoromethyl) benzidine, 4,4'-bis(4-aminophenoxy) biphenyl and 4,4'-diaminodiphenylether are more preferably used, and 2,2'-bis(trifluoromethyl) benzidine is still more preferably used.

The polyamideimide resin, which is an embodiment of the present invention, is a condensation-type polymer which is a polycondensation product of a diamine compound with a tetracarboxylic acid compound (tetracarboxylic acid compound analogs such as acid chloride compounds and tetracarboxylic dianhydrides) and with a dicarboxylic acid compound (dicarboxylic acid compound analogs such as acid chloride compounds), and optionally a diamine compound with a tricarboxylic acid compound (tricarboxylic acid compound analogs such as acid chloride compounds and tricarboxylic acid anhydrides).

The constitutional units represented by formula (1) and formula (10-2) are usually derived from diamines and tetracarboxylic acid compounds. The constitutional unit represented by formula (2) is usually derived from a diamine and a dicarboxylic acid compound. The constitutional unit represented by formula (11-2) is usually derived from a diamine and a tricarboxylic acid compound.

In a preferred embodiment of the present invention, the polyamideimide resin may contain a halogen atom as described above. Specific examples of fluorine-containing substituents include a fluoro group and a trifluoromethyl group. Since the polyamideimide resin contains a halogen atom, in some cases, it may be possible to reduce a yellow index (also referred to as YI) of an optical member including a polyamideimide resin, and it tends to be able to achieve both high flexibility and bending resistance. In addition, the halogen atom is preferably a fluorine atom in terms of reduction of the yellow index (that is, improving the transparency), reduction of the water absorption rate, and bending resistance of the optical member.

The content ratio of the halogen atom in the polyamideimide resin is preferably from 1 to 40% by mass, more preferably 3 to 35% by mass, and still more preferably 5 to 32% by mass, based on the mass of the polyamideimide resin in terms of reduction of the yellow index (improvement of transparency), reduction of water absorption rate, and suppression of deformation of the optical member.

In an embodiment of the present invention, an imidization catalyst may be present in the synthesis reaction of the polyamideimide resin. Examples of the imidization catalyst include aliphatic amines such as tripropylamine, dibutylpropylamine, and ethyldibutylamine; alicyclic amines (monocyclic) such as N-ethylpiperidine, N-propylpiperidine, N-butylpyrrolidine, N-butylpiperidine, and N-propylhexahydroazepine; alicyclic amines (polycyclic) such as azabicyclo[2.2.1]heptane, azabicyclo[3.2.1]octane, azabicyclo[2.2.2]octane, and azabicyclo[3.2.2]nonane; and aromatic amines such as pyridine, 2-methylpyridine, 3-methylpyridine, 4-methylpyridine, 2-ethylpyridine, 3-ethylpyridine, 4-ethylpyridine, 2,4-dimethylpyridine, 2,4,6-trimethylpyridine, 3,4-cyclopentenopyridine, 5,6,7,8-tetrahydroisoquinoline, and isoquinoline.

The reaction temperature of the diamine compound, the tetracarboxylic acid compound and the dicarboxylic acid compound is not particularly limited, and is, for example, 50 to 350° C. The reaction time is also not particularly limited, and is, for example, about 30 minutes to 10 hours. The reaction may be carried out under an inert atmosphere or reduced pressure conditions, if necessary. In addition, the reaction may be carried out in a solvent, and the solvent includes, for example, the solvent as described below, which are used for the preparation of polyamideimide varnish
(Optical Member)

In another embodiment of the present invention, there is also provided an optical member which is a polyamideimide film including the polyamideimide resin. The optical member includes, for example, an optical film. The optical member is appropriate as a front plate of an image display apparatus, particularly as a front plate (window film) of a flexible display, because it is excellent in flexibility, bending resistance and surface hardness. The optical member may be a single layer or a multilayer. When the optical member is a multilayer, each layer may have the same composition or different compositions.

In an embodiment of the present invention, the content of the polyamideimide resin in the optical member is preferably 40% by mass or more, more preferably 50% by mass or more, still more preferably 70% by mass or more, particularly preferably 80% by mass or more, and very preferably 90% by mass or more, based on the total mass of the optical member. If the content ratio of the polyamideimide resin is equal to or greater than the lower limit, bending resistance of the optical member is good. In addition, the content ratio of the polyamideimide resin in the optical member is usually 100% by mass or less based on the total mass of the optical member.
(Inorganic Material)

The optical member may further comprise an inorganic material such as inorganic particles in addition to the polyamideimide resin. Examples of the inorganic material include inorganic particles such as titania particles, alumina particles, zirconia particles and silica particles, and silicon compounds such as quaternary alkoxysilanes such as tetraethyl orthosilicate. The inorganic material is preferably an inorganic particle, particularly a silica particle in terms of the stability of the polyamideimide varnish for manufacturing the optical member. The inorganic particles may be bound together by a molecule having a siloxane bond (i.e., —SiOSi—)

An average primary particle diameter of the inorganic particles is preferably 10 to 100 nm, and more preferably 20 to 80 nm in terms of transparency and mechanical properties of the optical member, and aggregation suppression of the inorganic particles. In the present invention, the average primary particle diameter can be determined by measuring a 10-point average value of a diameter in a fixed direction with a transmission electron microscope.

The content ratio of the inorganic material in the optical member is preferably 0% by mass or more and 90% by mass or less, more preferably 0.01% by mass or more and 60% by mass or less, and still more preferably 5% by mass or more and 40% by mass or less, based on the total mass of the optical member. When the content of the inorganic material is within the above range, it tends to be able to achieve both the transparency and the mechanical properties of the optical member compatible with each other.
(Ultraviolet Absorber)

The optical member may contain one or more ultraviolet absorbers. The ultraviolet absorber can be appropriately selected from those usually used as an ultraviolet absorber in the field of resin materials. The ultraviolet absorber may contain a compound that absorbs light having a wavelength of 400 nm or less. Examples of the ultraviolet absorber include at least one compound selected from the group consisting of benzophenone-based compounds, salicylate-based compounds, benzotriazole-based compounds, and triazine-based compounds. Since the optical member contains the ultraviolet absorber, the deterioration of the polyamideimide resin is suppressed, such that the visibility of the optical member can be enhanced.

The term "based compound" as used herein refers to a derivative of a compound to which the "based compound" is attached. For example, the term "benzophenone-based compound" refers to a compound having benzophenone as a parent skeleton and a substituent bonded to benzophenone.

When the optical member contains an ultraviolet absorber, the content of the ultraviolet absorber is preferably 1% by mass or more, more preferably 2% by mass or more, still more preferably 3% by mass or more, preferably 10% by mass or less, more preferably 8% by mass or less, and still more preferably 6% by mass or less, with respect to the total mass of the optical member. A preferable content ratio varies depending on the ultraviolet absorber to be used. However, if the content of the ultraviolet absorber is adjusted so that the light transmittance at 400 nm is about 20 to 60%, the light resistance of the optical member can be enhanced, and at the same time the optical member having high transparency can be obtained.
(Other Additives)

The optical member may further contain other additives. Examples of other components include antioxidants, mold release agents, stabilizers, bluing agents, flame retardants, pH adjusters, silica dispersants, lubricants, thickeners and leveling agents.

The content of other additives is preferably 0% by mass or more and 20% by mass or less, and more preferably 0% by mass or more and 10% by mass or less, with respect to the mass of the optical member.

The thickness of the optical member, in particular the optical film, is appropriately adjusted depending on the application, but is usually 10 to 1000 μm, preferably 15 to 500 μm, more preferably 20 to 400 μm, and still more preferably 25 to 300 μm. Further, in the present invention, the thickness can be measured by a contact type digimatic indicator.

In the optical member, the total light transmittance (Tt) according to JIS K 7105: 1981 is preferably 70% or more, more preferably 80% or more, still more preferably 85% or more, and particularly preferably 90% or more. If the total light transmittance (Tt) of the optical member is equal to or greater than the lower limit, sufficient visibility can be ensured when the optical member is incorporated into the image display apparatus. In addition, the upper limit of the total light transmittance (Tt) of the optical member is usually 100% or less.

(Method of Manufacturing Optical Member)

The method for manufacturing the optical member, in particular the optical film, is not particularly limited as long as the optical member comprises the polyamideimide resin. In an embodiment of the present invention, the optical member, in particular the optical film can be manufactured by a manufacturing method including, for example, the following steps:

(a) a step of applying a liquid (polyamideimide varnish) containing a polyamideimide resin to a substrate to form a coating film (coating step), and (b) a step of drying the applied liquid (polyamideimide varnish) to form an optical member, particularly an optical film (polyamideimide film) (forming step). The steps (a) and (b) can usually be carried out in this order.

In the coating step, a liquid (polyamideimide varnish) containing a polyamideimide resin is first prepared. In order to prepare a polyamideimide varnish, the diamine compound, the tetracarboxylic acid compound, the dicarboxylic acid compound, and if necessary, other components such as a tertiary amine serving as an imidization catalyst and a dehydrating agent are mixed and reacted to prepare a mixed polyamideimide solution. Examples of the tertiary amine include the above-mentioned aromatic amines and aliphatic amines. Examples of the dehydrating agent include acetic anhydride, propionic anhydride, isobutyric anhydride, pivalic anhydride, butyrate anhydride, and isovaleric anhydride. A poor solvent is added to the mixed polyamideimide solution, and the polyamideimide resin is precipitated by the reprecipitation method, dried and taken out as a precipitate.

The taken out polyamideimide resin precipitate is dissolved in a solvent, and if necessary, the above-mentioned ultraviolet absorber and other additives are added and stirred to prepare a solution (polyamideimide varnish) containing the polyamideimide resin.

The solvent used for preparing the polyamideimide varnish is not particularly limited as long as it can dissolve the polyamideimide resin. Examples of such a solvent include amide-based solvents such as N,N-dimethylacetamide and N,N-dimethylformamide; lactone-based solvents such as γ-butyrolactone and γ-valerolactone; sulfur-containing solvents such as dimethyl sulfone, dimethyl sulfoxide, and sulfolane; carbonate-based solvents such as ethylene carbonate and propylene carbonate; and combinations thereof (mixed solvents). Of these solvents, amide-based solvents or lactone-based solvents are preferred. In addition, the polyamideimide varnish may contain water, alcohol-based solvents, ketone-based solvents, non-cyclic ester-based solvents, ether-based solvents, or the like.

Next, a coating film can be formed by casting, or the like using a polyamideimide varnish on a substrate such as a resin substrate, an SUS belt, or a glass substrate by, for example, a known roll-to-roll or batch method.

In the forming step, the optical member can be formed by drying the coating film and peeling it from the substrate. After peeling, a drying step of drying the optical member may further be carried out. Drying of the coating film can be carried out usually at a temperature of 50 to 350° C. The coating film may be dried under an inert atmosphere or reduced pressure conditions, if necessary.

A surface treatment step of performing surface treatment on at least one surface of the optical member may be carried out. Examples of the surface treatment include UV ozone treatment, plasma treatment, and corona discharge treatment.

Examples of the resin substrate include a PET film, a PEN film, a polyimide film, and a polyamideimide film. Of these, a PET film, a PEN film, a polyimide film, and a polyamideimide film are preferable in terms of excellent heat resistance. Further, a PET film is more preferable in terms of adhesion with the optical member and cost.

[Functional Layer]

The optical member which is an embodiment of the present invention may be provided with a functional layer. Examples of the functional layer include layers having various functions such as an ultraviolet absorbing layer, an adhesive layer, a color adjusting layer, and a refractive index adjusting layer. The optical member may be provided with one or more functional layers. One functional layer may also have a plurality of functions.

The ultraviolet absorbing layer is a layer having an ultraviolet absorbing function, and is composed of, for example, a main material selected from an ultraviolet curable transparent resin, an electron beam curable transparent resin, and a thermosetting transparent resin, and an ultraviolet absorber dispersed in the main material. It is possible to easily suppress the change in the yellow index caused by light irradiation by providing the ultraviolet absorbing layer as the functional layer.

The adhesive layer is a layer having an adhesive function, and has a function of adhering the optical member to another member. Those usually known can be used as a material for forming the adhesive layer. For example, a thermosetting resin composition or a photocurable resin composition can be used.

The adhesive layer may be composed of a resin composition containing a component having a polymerizable functional group. In this case, the resin composition constituting the adhesive layer is further polymerized after the optical member is brought into close contact with the other members, whereby strong adhesion can be realized. The adhesive strength between the optical member and the adhesive layer may be 0.1 N/cm or more, or 0.5 N/cm or more.

The adhesive layer may contain a thermosetting resin composition or a photocurable resin composition as a material. In this case, the resin composition can be polymerized and cured by supplying energy afterwards.

The adhesive layer may be a layer composed of an adhesive that is adhered to an object by pressing force, which is called a pressure sensitive adhesive (PSA). The pressure-sensitive adhesive may be an adhesive, which is "a substance which has adhesiveness at room temperature and adheres to the adherend with a light pressure" (JIS K6800), and may be a capsule-type adhesive which is "an adhesive capable of containing a specific component in a protective film (microcapsule) and maintaining stability until the film is broken by appropriate means (pressure, heat, etc.)" (JIS K6800).

The color adjusting layer is a layer having a function of color adjustment, and is a layer capable of adjusting the optical member to a desired color. The color adjusting layer is, for example, a layer containing a resin and a colorant. Examples of this colorant include inorganic pigments such as titanium oxide, zinc oxide, red iron oxide, calcined titanium oxide pigments, ultramarine blue, cobalt aluminate, and carbon black; an organic pigment such as azo-based compounds, quinacridone-based compounds, anthraquinone-based compounds, perylene-based compounds, isoindolinone-based compounds, phthalocyanine-based compounds, quinophthalone-based compound, threne-based compounds, and diketopyrrolopyrrole-based compounds; and extender pigments such as barium sulfate and calcium carbonate; and dyes such as basic dyes, acid dyes, and mordant dyes.

The refractive index adjusting layer is a layer having a function of adjusting the refractive index, and is a layer having a refractive index different from that of the optical member and capable of giving a predetermined refractive index to the optical member. The refractive index adjusting layer may be, for example, a resin layer containing an appropriately selected resin, and optionally further a pigment, or may be a metal thin film.

Examples of pigments for adjusting the refractive index include silicon oxide, aluminum oxide, antimony oxide, tin oxide, titanium oxide, zirconium oxide, and tantalum oxide. The average primary particle diameter of the pigment may be 0.1 µm or less. Irregular reflection of light transmitted through the refractive index adjusting layer can be prevented, and a decrease in transparency can be prevented by setting the average primary particle diameter of the pigment to 0.1 µm or less.

Examples of metals used for the refractive index adjusting layer include metal oxides or metal nitrides such as titanium oxide, tantalum oxide, zirconium oxide, zinc oxide, tin oxide, silicon oxide, indium oxide, titanium oxynitride, titanium nitride, silicon oxynitride, and silicon nitride.

In addition, the optical member may be provided with a hard coat layer. Examples of the hard coat layer include known hard coats such as acrylic-based hard coat layer, epoxy-based hard coat layer, urethane-based hard coat layer, benzyl chloride-based hard coat layer, and vinyl-based hard coat layer. Furthermore, in a preferred embodiment of the present invention, the optical member can exhibit a high surface hardness even without the hard coat layer. Thus, a hard coat layer laminate including the optical member made of the polyamideimide resin can exhibit higher surface hardness than the hard coat laminate including the optical member which cannot exhibit high surface hardness alone.

The optical member can exhibit high surface hardness. In a preferred embodiment of the present invention, the surface hardness of the optical member is preferably 2B or more, more preferably B or more, still more preferably HB or more, particularly preferably H or more, and very preferably 2H or more. If the surface hardness of the optical member is equal to or greater than the lower limit, in the case of using it as a front plate (window film) of the image display apparatus, it is possible to advantageously suppress scratches on the surface of the image display apparatus and to contribute to the prevention of contraction and expansion of the optical member. Further, the surface hardness of the optical member is usually 9H or less. In addition, in the present invention, the surface hardness can be measured according to JIS K5600-5-4:1999. For example, the evaluation of the presence or absence of scratches was performed under an environment of 4000 lux with a load of 100 g and a scanning speed of 60 mm/min. The flexibility of a flexible display can be used to make the image display apparatus into various shapes as well as flat shapes. As the image display apparatus becomes more flexible, the user has more opportunities to directly touch the screen or directly touch the screen with surrounding objects. Therefore, the optical member, which is an embodiment of the present invention, is very useful as the front plate of the flexible display.

The optical member can exhibit high flexibility. In a preferred embodiment of the present invention, the elastic modulus of the optical member is preferably 5.9 GPa or less, more preferably 5.5 GPa or less, still more preferably 5.2 GPa or less, particularly preferably 5.0 GPa or less, and most preferably 4.5 GPa or less. If the elastic modulus of the optical member is equal to or less than the upper limit, damage of the other member by the optical members can be suppressed when the flexible display is bent. Further, the elastic modulus of the optical member is usually 2.0 GPa or more. The elastic modulus can be measured from, for example, the slope of an S-S curve measured with a 10 mm wide test piece under the conditions of a distance between chucks of 500 mm and a tensile speed of 20 mm/min, using an autograph AG-IS manufactured by Shimadzu Corporation.

The optical member, particularly the optical film, can exhibit excellent bending resistance. In a preferred embodiment of the present invention, when the optical member is measured at a speed of 175 cpm and a load of 0.75 kgf for 135° with R=1 mm, the number of reciprocating bending times until breaking is preferably 10,000 times or more, more preferably 20,000 times or more, more preferably 30,000 times or more, particularly preferably 40,000 times or more, and most preferably 50,000 times or more.

If the number of reciprocating bending times of the optical member is equal to or greater than the lower limit, a folding wrinkle that can be generated when the optical member is bent can be further suppressed. In addition, the number of reciprocating bending times of the optical member is not limited, but it is sufficiently practical as long as 1,000,000 times of bending is usually possible. The number of reciprocating bending times can be obtained, for example, by using a test piece (optical member) having a thickness of 50 µm and a width of 10 mm with an MIT folding endurance tester (model 0530) manufactured by Toyo Seiki Seisaku-sho, Ltd.

The optical member can exhibit excellent transparency. Therefore, the optical member is very useful as a front plate of an image display apparatus, particularly, a front plate (window film) of a flexible display. In a preferred embodiment of the present invention, the optical member preferably has the yellow index (YI) according to JIS K 7373: 2006 of 5 or less, more preferably 3 or less, and still more preferably 2.5 or less. The optical member whose yellow index (YI) is equal to or less than the upper limit, can contribute to high visibility of a display apparatus, or the like. In addition, the optical member preferably has the yellow index of 0 or more.

The optical member, particularly the optical film, which is an embodiment of the present invention, is useful as a front plate of the image display apparatus, particularly as a front plate (window film) of the flexible display. The optical member can be disposed as the front plate on the viewing side surface of the image display apparatus, particularly the flexible display. This front plate has a function of protecting the image display element in the flexible display. The image display apparatus provided with the above-mentioned optical member has high flexibility and bending resistance as well as high surface hardness. Therefore, upon bending, the other members are not damaged, and also the optical member itself is less prone to folding, and scratches on the surface can be advantageously suppressed.

Examples of the image display apparatus include a television, a smartphone, a mobile phone, a car navigation device, a tablet PC, a portable game machine, an electronic paper, an indicator, a bulletin board, a watch, and a wearable device such as a smart watch. Examples of the flexible display include an image display apparatus having flexible characteristics, for example, a television, a smartphone, a mobile phone, a car navigation device, a tablet PC, a portable game machine, an electronic paper, an indicator, a bulletin board, a watch, a wearable device, or the like.

EXAMPLES

Hereinafter, the present invention will be described in more detail by wary of examples. "%" and "parts" in the examples mean % by mass and parts by mass, unless otherwise stated. First, the evaluation method will be described.

<Measurement of Elastic Modulus>

The elastic modulus of the polyamideimide film obtained in the examples was measured using an autograph AG-IS manufactured by Shimadzu Corporation. A 10 mm wide film was produced, an S-S curve was measured under the conditions of a distance between chucks of 500 mm and a tensile speed of 20 mm/min, and the elastic modulus was calculated from the slope.

<Measurement of Surface Hardness>

As the surface hardness of the polyamideimide film obtained in the examples, the pencil hardness of the film surface was adopted in accordance with JIS K 5600-5-4: 1999. The evaluation of the presence or absence of scratches was performed under an environment of 4000 lux with a load of 100 g and a scanning speed was 60 mm/min.

<Measurement of Bending Resistance>

The bending resistance of the polyamideimide film obtained in the examples was measured using an MIT folding endurance tester (model 0530) manufactured by Toyo Seiki Seisaku-sho, Ltd. A film having a thickness of 50 μm and a width of 10 mm was produced, and the number of reciprocating bending times until breakage was evaluated when measured at a speed of 175 cpm and a load of 0.75 kgf for 135° with R=1 mm.

<Measurement of Weight Average Molecular Weight (Mw)>

Measurement of Gel Permeation Chromatography (GPC)

(1) Pretreatment Method

A DMF eluent (10 mM lithium bromide solution) was added to the sample to a concentration of 2 mg/mL, and the mixture was heated at 80° C. for 30 minutes while stirring, cooled, and then filtered through a 0.45 μm membrane filter to obtain a measurement solution.

(2) Measurement Conditions

Column; TSKgel SuperAWM-H×2+SuperAW 2500×1 (6.0 mm I.D.×150 mm×3) (all manufactured by Tosoh Corporation)

Eluent: DMF (10 mM lithium bromide added)

Flow rate: 1.0 mL/min.

Detector: RI detector

Column temperature: 40° C.

Injection volume: 100 μL

Molecular weight standard: Standard polystyrene

<Measurement of Total Light Transmittance (Tt)>

The total light transmittance (Tt) of the polyamideimide film obtained in the examples was measured by a fully automatic direct reading haze computer HGM-2DP manufactured by Suga Test Instruments Co., Ltd. in accordance with JIS K 7105: 1981.

<Measurement of Yellow Index (YI)>

The yellow index (YI) of the polyamideimide film obtained in the examples is measured using an ultraviolet visible near infrared spectrophotometer V-670 manufactured by JASCO Corporation in accordance with JIS K 7373: 2006. After performing background measurement in the absence of a film, the film was set in a sample holder, and transmittance measurements for light of 300 to 800 nm were performed to obtain tristimulus values (X, Y, Z). YI was calculated based on the following equation:

$$YI=100\times(1.2769X-1.0592Z)/Y$$

<Measurement of Glass Transition Temperature (Tg)>

The polyamideimide film obtained in the example is used as a sample as described below using a DMA Q800 manufactured by TA Instrument, and measured under the following conditions to obtain a tan δ curve which is the ratio of the loss elastic modulus and the storage elastic modulus. Tg was calculated from the top of the peak of the tan δ curve.

Sample: length 5-15 mm, width 5 mm

Experimental mode: DMA Multi-Frequency-Strain

Detailed conditions of experimental mode:

(1) Clamp: Tension: Film (2) Amplitude: 5 μm (3) Frequency: 10 Hz (no fluctuation in all temperature sections)

(4) Preload Force: 0.01 N (5) Force Track: 125 N

Temperature conditions: (1) temperature rise range: room temperature to 400° C., (2) temperature rise rate: 5° C./min Main collection data: (1) Storage modulus (E'), (2) Loss modulus (E"), and (3) tan δ (E"/E')

Example 1

[Preparation of Polyamideimide Resin (1)]

Under a nitrogen atmosphere, to a 1 L separable flask equipped with a stirring wing were added 52 g (162.38 mmol) of 2,2'-bis(trifluoromethyl) benzidine (TFMB) and 734.10 g of N,N-dimethylacetamide (DMAc), and TFMB was dissolved in DMAc while stirring at room temperature. Next, to the flask was added 28.90 g (65.05 mmol) of 4,4'-(hexafluoroisopropylidene)diphthalic dianhydride (6FDA), and the mixture was stirred at room temperature for 3 hours. Thereafter, to the flask was added 28.80 g (97.57 mmol) of 4,4'-oxybis(benzoyl chloride) (OBBC), and the mixture was stirred at room temperature for 1 hour. Then, to the flask were added 7.49 g (94.65 mmol) of pyridine and 26.56 g (260.20 mmol) of acetic anhydride, the mixture was stirred at room temperature for 30 minutes, the temperature was raised to 70° C. using an oil bath, and then the mixture was stirred again for 3 hours to obtain a reaction solution.

The resulting reaction solution was cooled to room temperature, charged into a large amount of methanol in a filamentous form. The precipitated precipitate was taken out, immersed in methanol for 6 hours, and then washed with methanol. Next, the precipitate was dried under reduced pressure at 100° C. to obtain a polyamideimide resin (1).

[Film Formation of Polyamideimide Film (1)]

DMAc was added to the resulting polyamideimide resin (1) so that the concentration was 15% by mass, thereby preparing a polyamideimide varnish (1). The resulting polyamideimide varnish (1) was coated on a smooth surface of a polyester substrate (manufactured by Toyobo Co., Ltd., trade name "A4100") using an applicator so that the film thickness of the free standing film is 55 μm, and the film was dried at 50° C. for 30 minutes and then at 140° C. for 15 minutes to obtain a self-standing film. The self-standing film was fixed to a metal frame, and dried again at 300° C. for 30 minutes in a nitrogen atmosphere to obtain a polyamideimide film (1) having a thickness of 50 μm. As a result of measuring the weight average molecular weight (Mw), the total light transmittance (Tt), the yellow index (YI), and the glass transition temperature (Tg) of the polyamideimide film (1) according to the above measurement method, Mw was 120,000, Tt was 91%, YI was 2.2, and Tg was 345° C. In addition, the molar ratios of the respective components are shown in Table 1.

Example 2

[Preparation of Polyamideimide Resin (2)]

A polyamideimide resin (2) was obtained in the same manner as in Example 1 [Preparation of polyamideimide resin (1)], except that the amount of DMAc used was changed to 701.64 g, the amount of 6FDA used was changed to 14.45 g (32.52 mmol), the amount of OBBC used was changed to 38.39 g (130.10 mmol), the amount of pyridine used was changed to 9.98 g (126.20 mmol), and the amount of acetic anhydride used was changed to 13.28 g (130.10 mmol). In addition, the molar ratios of the respective components are shown in Table 1.

[Film Formation of Polyamideimide Film (2)]

A polyamideimide film (2) having a thickness of 50 μm was obtained in the same manner as in Example 1 [Film formation of polyamideimide film (1)], except that the polyamideimide resin (2) was used instead of the polyamideimide resin (1). As a result of measuring the weight average molecular weight (Mw), the total light transmittance (Tt), the yellow index (YI), and the glass transition temperature (Tg) of the polyamideimide film (2) according to the above measurement method, Mw was 150,000, Tt was 91%, YI was 2.5, and Tg was 345° C.

Example 3

[Preparation of Polyamideimide Resin (3)]

Under a nitrogen gas atmosphere, to a 1 L separable flask equipped with a stirring wing were added 52 g (162.38 mmol) of TFMB and 697.82 g of DMAc, and TFMB was dissolved in DMAc while stirring at room temperature. Next, to the flask was added 21.67 g (48.79 mmol) of 6FDA, and the mixture was stirred at room temperature for 3 hours. Thereafter, to the flask were added 24.00 g (81.31 mmol) of OBBC and then 6.60 g (32.52 mmol) of terephthaloyl chloride (TPC), and the mixture was stirred at room temperature for 1 hour. Then, to the flask were added 8.73 g (110.42 mmol) of pyridine and 19.92 g (195.15 mmol) of acetic anhydride, the mixture was stirred at room temperature for 30 minutes, the temperature was raised to 70° C. using an oil bath, and then the mixture was stirred again for 3 hours to obtain a reaction solution.

The resulting reaction solution was cooled to room temperature, charged into a large amount of methanol in a filamentous form. The precipitated precipitate was taken out, immersed in methanol for 6 hours, and then washed with methanol. Next, the precipitate was dried under reduced pressure at 100° C. to obtain a polyamideimide resin (3). In addition, the molar ratios of the respective components are shown in Table 1.

[Film Formation of Polyamideimide Film (3)]

A polyamideimide film (3) having a thickness of 50 μm was obtained in the same manner as in Example 1 [Film formation of polyamideimide film (1)], except that the polyamideimide resin (3) was used instead of the polyamideimide resin (1). As a result of measuring the weight average molecular weight (Mw), the total light transmittance (Tt), the yellow index (YI), and the glass transition temperature (Tg) of the polyamideimide film (3) according to the above measurement method, Mw was 100,000, Tt was 91%, YI was 2.3, and Tg was 340° C.

Example 4

[Preparation of Polyamideimide Resin (4)]

A polyamideimide resin (4) was obtained in the same manner as in Example 3 [Preparation of polyamideimide resin (3)], except that the amount of DMAc used was changed to 667.75 g, the amount of 6FDA used was changed to 21.67 g (162.38 mmol), the amount of OBBC used was changed to 9.60 g (48.79 mmol), the amount of TPC used was changed to 16.51 g (81.31 mmol), the amount of pyridine used was changed to 8.73 g (110.42 mmol), and the amount of acetic anhydride used was changed to 19.92 g (195.15 mmol). In addition, the molar ratios of the respective components are shown in Table 1.

[Film Formation of Polyamideimide Film (4)]

A polyamideimide film (4) having a thickness of 50 μm was obtained in the same manner as in Example 1 [Film formation of polyamideimide film (1)], except that the polyamideimide resin (4) was used instead of the polyamideimide resin (1). As a result of measuring the weight average molecular weight (Mw), the total light transmittance (Tt), the yellow index (YI), and the glass transition temperature (Tg) of the polyamideimide film (4) according to the above measurement method, Mw was 230,000, Tt was 91%, YI was 2.3, and Tg was 369° C.

Example 5

[Preparation of Polyamideimide Resin (5)]

A polyamideimide resin (5) was obtained in the same manner as in Example 3 [Preparation of polyamideimide resin (3)], except that the amount of DMAc used was changed to 884.53 g, the amount of 6FDA used was changed to 21.67 g (38.79 mmol), the amount of OBBC used was changed to 4.80 g (16.26 mmol), the amount of TPC used was changed to 19.81 g (97.57 mmol), the amount of pyridine used was changed to 8.73 g (110.42 mmol), and the amount of acetic anhydride used was changed to 19.92 g (195.15 mmol). In addition, the molar ratios of the respective components are shown in Table 1.

[Film Formation of Polyamideimide Film (5)]

A polyamideimide film (5) having a thickness of 50 μm was obtained in the same manner as in Example 1 [Film formation of polyamideimide film (1)], except that the polyamideimide resin (5) was used instead of the polyamideimide resin (1). As a result of measuring the weight average molecular weight (Mw), the total light transmittance (Tt), the yellow index (YI), and the glass transition temperature (Tg) of the polyamideimide film (5) according to the above measurement method, Mw was 345,000, Tt was 91%, YI was 2.2, and Tg was 377° C.

Example 6

[Preparation of Polyamideimide Resin (6)]

A polyamideimide resin (6) was obtained in the same manner as in Example 3 [Preparation of polyamideimide resin (3)], except that the amount of DMAc used was changed to 849.23 g, the amount of 6FDA used was changed to 14.45 g (32.52 mmol), the amount of OBBC used was changed to 4.80 g (16.26 mmol), the amount of TPC used was changed to 23.11 g (113.84 mmol), the amount of pyridine used was changed to 9.98 g (126.20 mmol), and the amount of acetic anhydride used was changed to 13.28 g (130.10 mmol). In addition, the molar ratios of the respective components are shown in Table 1.

[Film Formation of Polyamideimide Film (6)]

A polyamideimide film (6) having a thickness of 50 μm was obtained in the same manner as in Example 1 [Film formation of polyamideimide film (1)], except that the polyamideimide resin (6) was used instead of the polyamideimide resin (1). As a result of measuring the weight average molecular weight (Mw), the total light transmittance (Tt), the yellow index (YI), and the glass transition temperature (Tg) of the polyamideimide film (6) according to the above measurement method, Mw was 341,000, Tt was 91%, YI was 2.4, and Tg was 378° C.

Comparative Example 1

[Preparation of Polyamideimide Resin (7)]

A polyamideimide resin (7) was obtained in the same manner as in Example 3 [Preparation of polyamideimide resin (3)], except that the amount of DMAc used was changed to 647.70 g, the amount of 6FDA used was changed to 21.67 g (48.79 mmol), the amount of TPC used was changed to 23.11 g (113.84 mmol), the amount of pyridine used was changed to 8.73 g (110.42 mmol), the amount of acetic anhydride used was changed to 19.92 g (195.15 mmol), and OBBC was not added. In addition, the molar ratios of the respective components are shown in Table 1.

[Film Formation of Polyamideimide Film (7)]

A polyamideimide film (7) having a thickness of 50 μm was obtained in the same manner as in Example 1 [Film formation of polyamideimide film (1)], except that the polyamideimide resin (7) was used instead of the polyamideimide resin (1). As a result of measuring the weight average molecular weight (Mw), the total light transmittance (Tt), the yellow index (YI), and the glass transition temperature (Tg) of the polyamideimide film (7) according to the above measurement method, Mw was 80,000, Tt was 90%, YI was 2.4, and Tg was 380° C.

Comparative Example 2

[Preparation of Polyimide Resin (8)]

A polyimide resin (8) was obtained in the same manner as in Example 1 [Preparation of polyamideimide resin (1)], except that the amount of DMAc used was changed to 831.46 g, the amount of 6FDA used was changed to 72.24 g (162.62 mmol), the amount of pyridine used was changed to 18.72 g (236.62 mmol), the amount of acetic anhydride used was changed to 66.41 g (650.49 mmol), and OBBC was not added. In addition, the molar ratios of the respective components are shown in Table 1.

[Film Formation of Polyimide Film (8)]

A polyimide film (8) having a thickness of 50 μm was obtained in the same manner as in Example 1 [Film formation of polyamideimide film (1)], except that the polyimide resin (8) was used instead of the polyamideimide resin (1). As a result of measuring the weight average molecular weight (Mw), the total light transmittance (Tt), the yellow index (YI), and the glass transition temperature (Tg) of the polyimide film (8) according to the above measurement method, Mw was 268,000, Tt was 92%, YI was 2.0, and Tg was 361° C.

Comparative Example 3

[Preparation of Polyimide Resin (9)]

A polyimide resin (9) was obtained in the same manner as in Example 1 [Preparation of polyamideimide resin (1)], except that the amount of DMAc used was changed to 732.20 g, the amount of 6FDA used was changed to 28.9 g (65.05 mmol), the amount of pyridine used was changed to 18.72 g (236.62 mmol), the amount of acetic anhydride used was changed to 66.41 g (650.49 mmol), OBBC was not added, and 6FDA and 28.51 g (97.57 mmol) of 4,4'-biphenyltetracarboxylic dianhydride (BPDA) were simultaneously added. In addition, the molar ratios of the respective components are shown in Table 1.

[Film Formation of Polyimide Film (9)]

A polyimide film (9) having a thickness of 50 μm was obtained in the same manner as in Example 1 [Film formation of polyamideimide film (1)], except that the polyimide resin (9) was used instead of the polyamideimide resin (1). As a result of measuring the weight average molecular weight (Mw), the total light transmittance (Tt), the yellow index (YI), and the glass transition temperature (Tg) of the polyimide film (9) according to the above measurement method, Mw was 276,000, Tt was 85%, YI was 5.8, and Tg was 365° C.

Example 7

[Preparation of Polyamideimide Resin (10)]

Under a nitrogen gas atmosphere, to a 1 L separable flask equipped with a stirring wing were added 45.00 g (140.5 mmol) of TFMB and 600.9 g of DMAc, and TFMB was dissolved in DMAc while stirring at room temperature. Next, to the flask was added 4.14 g (14.1 mmol) of BPDA, the mixture was stirred at room temperature for 2.5 hours. Then, 25.01 g (56.3 mmol) of 6FDA was added thereto, and the mixture was stirred at room temperature for 15 hours. Further, to the flask were added 4.15 g (14.1 mmol) of OBBC and 11.43 g (56.3 mmol) of TPC, and the mixture was stirred at room temperature for 1 hour. Then, to the flask were added 21.55 g (211.1 mmol) of acetic anhydride and 3.28 g (35.2 mmol) of 4-picoline, the mixture was stirred at room temperature for 30 minutes, the temperature was raised to 70° C. using an oil bath, and then the mixture was stirred again for 3 hours to obtain a reaction solution.

After cooling the resulting reaction solution to room temperature, 647 g of methanol and 180 g of ion-exchanged water were added thereto to obtain a precipitate of polyamideimide. The precipitate was immersed in methanol for 12 hours, collected by filtration, and then washed with methanol. Next, the precipitate was dried under reduced pressure at 100° C. to obtain a polyamideimide resin (10). In addition, the molar ratios of the respective components are shown in Table 1.

[Film Formation of Polyamideimide Film (10)]

A polyamideimide film (10) having a thickness of 50 μm was obtained in the same manner as in Example 1 [Film formation of polyamideimide film (1)], except that the polyamideimide resin (10) was used instead of the polyamideimide resin (1), and drying was carried out at 200° C. for 30 minutes under the atmosphere instead of drying at 300° C. for 30 minutes under a nitrogen atmosphere. As a result of measuring the weight average molecular weight (Mw), the total light transmittance (Tt), the yellow index (YI), and the glass transition temperature (Tg) of the polyamideimide film (10) according to the above measurement method, Mw was 208,000, Tt was 91.8%, YI was 1.8, and Tg was 373° C.

Example 8

[Preparation of Polyamideimide Resin (11)]

Under a nitrogen gas atmosphere, to a 1 L separable flask equipped with a stirring wing were added 14.67 g (45.8 mmol) of TFMB and 233.3 g of DMAc, and TFMB was dissolved in DMAc while stirring at room temperature. Next, to the flask was added 4.283 g (13.8 mmol) of 4,4'-oxydiphthalic dianhydride (OPDA), and the mixture was stirred at room temperature for 16.5 hours. Thereafter, to the flask were added 1.359 g (4.61 mmol) of OBBC and 5.609 g (27.6 mmol) of TPC, and the mixture was stirred at room temperature for 1 hour. Then, to the flask were added 4.937 g (48.35 mmol) of acetic anhydride and 1.501 g (16.12 mmol) of 4-picoline, the mixture was stirred at room temperature for 30 minutes, the temperature was raised to 70° C. using an oil bath, and then the mixture was stirred again for 3 hours to obtain a reaction solution.

After cooling the resulting reaction solution to room temperature, 360 g of methanol and 170 g of ion-exchanged water were added thereto to obtain a precipitate of polyamideimide. The precipitate was immersed in methanol for 12 hours, collected by filtration, and then washed with methanol. Next, the precipitate was dried under reduced pressure at 100° C. to obtain a polyamideimide resin (11). In addition, the molar ratios of the respective components are shown in Table 1.

[Film Formation of Polyamideimide Film (11)]

A polyamideimide film (11) having a thickness of 50 μm was obtained in the same manner as in Example 7 [Film formation of polyamideimide film (10)], except that the polyamideimide resin (11) was used instead of the polyamideimide resin (10). As a result of measuring the weight average molecular weight (Mw), the total light transmittance (Tt), the yellow index (YI), and the glass transition temperature (Tg) of the polyamideimide film (11) according to the above measurement method, Mw was 259,000, Tt was 91.0%, YI was 1.9, and Tg was 362° C.

Example 9

[Preparation of Polyamideimide Resin (12)]

A polyamideimide resin (12) was obtained in the same manner as in Example 8 [Preparation of polyamideimide resin (11)], except that 6.140 g of 6FDA was used instead of 4.283 g of 4,4'-oxydiphthalic dianhydride (OPDA), and 8.809 g (27.5 mmol) of TFMB and 3.889 g (18.3 mmol) of 2,2'-dimethylbenzidine (MB) were used instead of 14.67 g (45.8 mmol) of TFMB. In addition, the molar ratios of the respective components are shown in Table 1.

[Film Formation of Polyamideimide Film (12)]

A polyamideimide film (12) having a thickness of 50 μm was obtained in the same manner as in Example 8 [Film formation of polyamideimide film (11)], except that the polyamideimide resin (12) was used instead of the polyamideimide resin (11). As a result of measuring the weight average molecular weight (Mw), the total light transmittance (Tt), the yellow index (YI), and the glass transition temperature (Tg) of the polyamideimide film (12) according to the above measurement method, Mw was 189,000, Tt was 91.1%, and Tg was 393° C.

Example 10

[Preparation of Polyamideimide Resin (13)]

A polyamideimide resin (13) was obtained in the same manner as in Example 9 [Preparation of polyamideimide resin (12)], except that 3.670 g (18.3 mmol) of 4,4'-diaminodiphenyl ether (ODA) was used instead of 3.889 g of MB. In addition, the molar ratios of the respective components are shown in Table 1.

[Film Formation of Polyamideimide Film (13)]

A polyamideimide film (13) having a thickness of 50 μm was obtained in the same manner as in Example 9 [Film formation of polyamideimide film (12)], except that the polyamideimide resin (13) was used instead of the polyamideimide resin (12). As a result of measuring the weight average molecular weight (Mw), the total light transmittance (Tt), the yellow index (YI), and the glass transition temperature (Tg) of the polyamideimide film (13) according to the above measurement method, Mw was 166,000, Tt was 91.3%, and Tg was 350° C.

The molar ratios of the respective components in the above examples and comparative examples are shown in Table 1 below.

TABLE 1

| | | Tetracarboxylic acid compound | | | Dicarboxylic acid compound | | Diamine compound | | |
|---|---|---|---|---|---|---|---|---|---|
| | | 6FDA | BPDA | OPDA | OBBC | TPC | TFMB | MB | ODA |
| Example | 1 | 4 | — | — | 6 | — | 10 | — | — |
| | 2 | 2 | — | — | 8 | — | 10 | — | — |
| | 3 | 3 | — | — | 5 | 2 | 10 | — | — |
| | 4 | 3 | — | — | 2 | 5 | 10 | — | — |
| | 5 | 3 | — | — | 1 | 6 | 10 | — | — |
| | 6 | 2 | — | — | 1 | 7 | 10 | — | — |
| | 7 | 4 | 1 | — | 1 | 4 | 10 | — | — |
| | 8 | — | — | 3 | 1 | 6 | 10 | — | — |
| | 9 | 3 | — | — | 1 | 6 | 6 | 4 | — |
| | 10 | 3 | — | — | 1 | 6 | 6 | — | 4 |
| Comparative Example | 1 | 3 | — | — | — | 7 | 10 | — | — |
| | 2 | 10 | — | — | — | — | 10 | — | — |
| | 3 | 4 | 6 | — | — | — | 10 | — | — |

The obtained polyamide films (1) to (9) were measured for their elastic modulus, surface hardness and bending resistance according to the above-mentioned measurement method. The results are shown in Table 2.

TABLE 2

|  |  | Film number | Elastic modulus (GPa) | Surface hardness | Bending resistance (times) |
|---|---|---|---|---|---|
| Example | 1 | (1) | 3.2 | HB | 53,000 |
|  | 2 | (2) | 3.4 | HB | 600,000 |
|  | 3 | (3) | 3.7 | HB | 95,000 |
|  | 4 | (4) | 4.2 | HB | 66,000 |
|  | 5 | (5) | 5.0 | HB | 230,000 |
|  | 6 | (6) | 5.2 | HB | 430,000 |
|  | 7 | (10) | 4.6 | HB | 36,000 |
|  | 8 | (11) | 5.2 | F | 94,000 |
|  | 9 | (12) | 5.7 | HB | 31,000 |
|  | 10 | (13) | 4.9 | HB | 62,000 |
| Comparative | 1 | (7) | 6.0 | H | 20,000 |
| Example | 2 | (8) | 3.4 | <6 B | 30,000 |
|  | 3 | (9) | 5.0 | <6 B | 40,000 |

From the above, it can be seen that the polyamideimide film (optical member) including the polyamideimide resin according to the present invention has a low elastic modulus, excellent flexibility and high bending resistance. In addition, the polyamideimide film has been shown to have high surface hardness, and scratches on the surface can also be suppressed.

The invention claimed is:

1. A polyamideimide resin having constitutional units represented by formula (1) and formula (2):

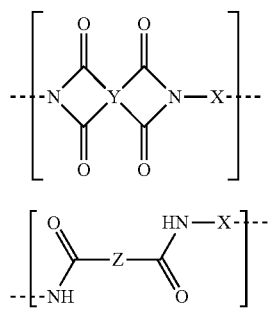

wherein
X represents a divalent organic group comprising a constitutional unit represented by formula (4):

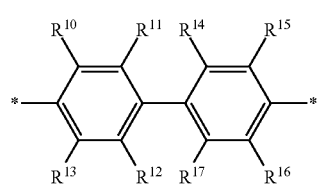

in which $R^{10}$ to $R^{17}$ each independently represents a hydrogen atom, an alkyl group having 1 to 6 carbon atoms, or an aryl group having 6 to 12 carbon atoms, and the hydrogen atoms contained in $R^{10}$ to $R^{17}$ may be each independently substituted with a halogen atom, and * represents a bonding hand, Y represents a tetravalent organic group comprising a constitutional unit represented by formula (5):

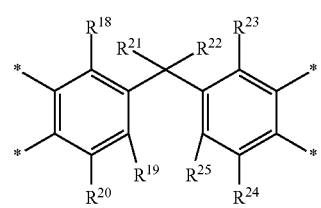

wherein $R^{18}$ to $R^{25}$ each independently represents a hydrogen atom, an alkyl group having 1 to 6 carbon atoms, or an aryl group having 6 to 12 carbon atoms, and the hydrogen atoms contained in $R^{18}$ to $R^{25}$ may be each independently substituted with a halogen atom, and * represents a bonding hand, and at least a part of Z represents a divalent organic group comprising a constitutional unit represented by formula (3):

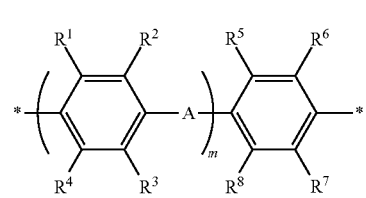

wherein $R^1$ to $R^8$ each independently represent a hydrogen atom, an alkyl group having 1 to 6 carbon atoms, or an aryl group having 6 to 12 carbon atoms, and the hydrogen atoms contained in $R^1$ to $R^8$ may each independently be substituted with a halogen atom, A represents —O—, —S—, —CO—, or —NR$^9$—, and R$^9$ represents a hydrocarbon group having 1 to 12 carbon atoms which may be substituted with a halogen atom, m is an integer of 1 to 4, and * represents a bonding hand.

2. The polyamideimide resin according to claim 1, wherein the content ratio of the constitutional unit represented by formula (3) is 3 mol % or more and 90 mol % or less, with respect to a total of Y and Z.

3. The polyamideimide resin according to claim 1, wherein 5 mol % or more and 100 mol % or less of Z is represented by formula (3).

4. The polyamideimide resin according to claim 1, wherein a ratio of the constitutional unit represented by formula (3) is 3 mol % or more and 90 mol % or less, with respect to a total of the constitutional unit represented by formula (1) and the constitutional unit represented by formula (2).

5. The polyamideimide resin according to claim 1, wherein a content ratio of the constitutional unit represented by formula (1) is 10 mol % or more and 90 mol % or less, with respect to the total of the constitutional unit represented by formula (1) and the constitutional unit represented by formula (2).

6. The polyamideimide resin according to claim 1, wherein a glass transition temperature (Tg) calculated by tan δ in DMA measurement is less than 380° C.

7. The optical member comprising the polyamideimide resin according to claim 1.

8. An image display apparatus comprising the optical member according to claim 7.

* * * * *